United States Patent [19]

Beamon, III

[11] Patent Number: 5,166,778
[45] Date of Patent: Nov. 24, 1992

[54] SINGLE-LENS COLOR VIDEO STEREOSCOPIC HELMET MOUNTABLE DISPLAY

[75] Inventor: William S. Beamon, III, Ormond Beach, Fla.

[73] Assignee: General Electric Company, Philadelphia, Pa.

[21] Appl. No.: 755,427

[22] Filed: Sep. 5, 1991

[51] Int. Cl.$^5$ ............................................. H04N 15/00
[52] U.S. Cl. ......................................... 358/3; 340/705; 358/103; 358/250; 358/88
[58] Field of Search ................... 358/3, 92, 91, 88, 89, 358/104, 199, 60, 56, 103, 225, 250, 206; 340/705

[56] References Cited

U.S. PATENT DOCUMENTS

| | | | |
|---|---|---|---|
| 4,695,129 | 9/1987 | Faessen et al. | 358/3 X |
| 4,897,715 | 1/1990 | Beamon, III | 358/88 X |
| 5,040,058 | 8/1991 | Beamon, III | 340/705 X |

Primary Examiner—Victor R. Kostak
Attorney, Agent, or Firm—Geoffrey H. Krauss

[57] ABSTRACT

A helmet mountable display system may display a raster scanned image to each eye of a wearer of the helmet for presenting a stereoscopic image. The system includes a single lens unit operating with a single row of light sources and with first and second oscillatable deflecting surfaces for generating a different scanned image on each of a pair of juxtaposed projection screen portions. The image on each screen portion images is relayed to an associated eye of the wearer.

20 Claims, 2 Drawing Sheets

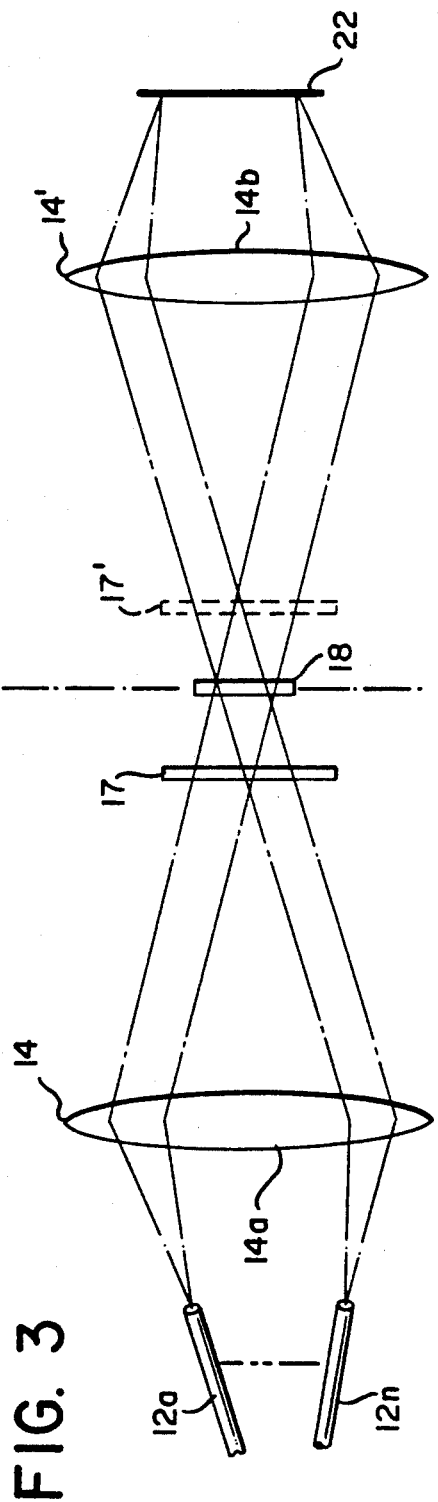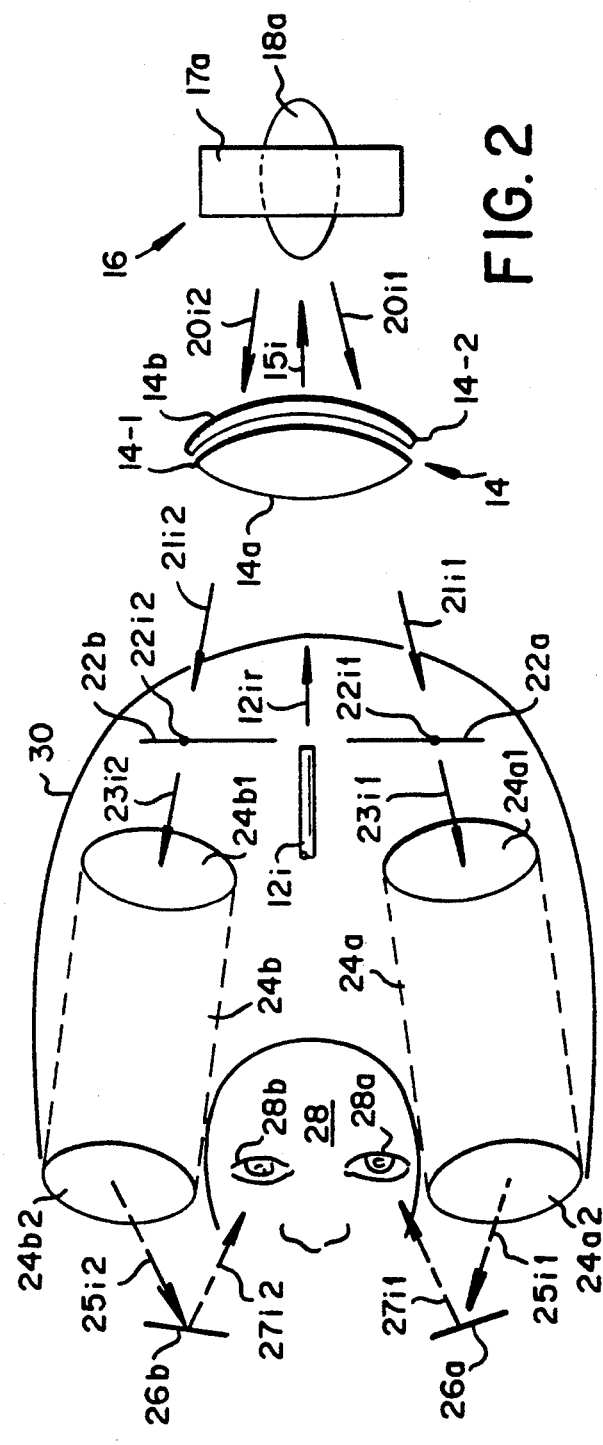

SINGLE-LENS COLOR VIDEO STEREOSCOPIC HELMET MOUNTABLE DISPLAY

BACKGROUND OF THE INVENTION

This invention relates to helmet mountable displays and, more particularly, to a self-contained, full-color, stereoscopic high-resolution helmet mountable video display, such as may be used in simulation systems like trainers, or during actual vehicle or aircraft operation as a display for sensors and/or instruments.

One type of helmet mountable display (HMD) system using a four lens optical system, a folding mirror and horizontal and vertical scanning mirror is described and claimed in U.S. Pat. No. 4,897,715, issued Jan. 30, 1990, assigned to the assignee of the present invention and incorporated in its entirely herein by reference thereto. Another form of HMD system uses two lenses in its optical system; this system, also invented by the present inventor, is described and claimed in U.S. Pat. application Ser. No. 07/456,502, filed Dec. 27, 1989, also assigned to the present assignee hereof and also incorporated herein in its entirely by reference. Although the inventions as described and claimed in U.S. Pat. No. 4,897,715 and in Pat. application No. 07/456,502 offer substantial improvements over prior display systems, the use of two or four lenses, even if able to be fabricated from a light-weight refractive material such as plastic rather than glass, still represent a significant weight that must be carried and accounted for by the wearer of the helmet.

It is desirable to reduce further the weight of the HMD system as described and claimed in either of the aforementioned U.S. Pat. No. 4,897,715 or application No. 07/456,502, while still obtaining the benefits thereof; elimination of any components is also expected to result in a cost reduction.

SUMMARY OF THE INVENTION

In accordance with the present invention, a helmet mountable display (HMD) system for displaying a scanned stereoscopic image to a wearer of the helmet, in response to a plurality of light sources each of which supplies a respective modulated color-light signal, comprises: a single lens means having at least one optical lens element and first and second surfaces; first and second screen means juxtaposed to one another; first and second deflecting, or reflecting, surfaces that are oscillatable about respective first and second axes to scan (preferably in raster fashion) each of the plurality of sources, after refraction through the single lens means, across the first and second screen means, to form at least portions of images thereon; and optical system means for not only energizing the light sources but also for relaying the first and second screen means images to the viewing organs of the wearer. The optical components and resulting optical paths may be arranged to be substantially symmetrical. The first and second screen means may be disposed with respect to each other such that their respective optical axes form a V, with the single lens means and the pair of deflecting surfaces disposed substantially at the apex of the V.

In one aspect of the present invention, each i-th one of the plurality N of light source means is optically coupled to the input of the single lens means for providing a respective i-th one of a like plurality of light signals, where $1 \leq i \leq n$; the single lens and the deflection means form a 1:1 telescope for scanning the fixed plurality of light sources as collimated light patterns on the first and second juxtaposed screens. The first deflecting surface is optically coupled to the second surface of the single lens means for deflecting the collimated light pattern in a first direction along a predetermined optical path to the second deflecting surface; the second deflecting surface deflects the collimated light pattern in a second direction along the optical path back to the second surface of the single lens means for focusing an image at a focal plane. The image available at the focal plane is a steroscopic raster-scanned color image, formed by perturbing the first and second surfaces in a predetermined pattern. A planar screen, such as a rear projection screen, may be disposed coplanar with the focal plane. The display system may further include optical system means optically coupled to the first surface of the single lens means, preferably via the screen, for transporting the focused collimated light from the single lens means to the wearer so that the wearer may observe the raster-scanned stereo image.

The first and second optical system relay means may each include a combination of cooperating optical elements such as lenses, prisms, and mirrors for providing the desired gain and optical path steering, as is known to one of ordinary skill in the art. In addition, as used herein "lens means" does not necessarily mean a single lens but is intended to comprehend all optical components that cooperatively act to perform the desired function of the "lens means", and may for example, include convex lenses, concave lenses, plano-convex and/or concave lenses, etc.

The orientation of the light ray sources, such as in a row or column line array, may be coordinated with the orientation of the first and second planar surfaces for producing either a vertically-scanned image or a horizontally-scanned image. The collimated light rays may be reflected a plurality of times between the first and second deflecting surfaces before being sent to the second surface of the single lens means. Each intersurface reflection decreases the overall angle through which the first and second deflecting surface must scan, and shortens the physical dimension between the single lens means and the first and second deflecting surfaces for a given focal length, while increasing the overall size requirements of the first and second deflecting surfaces. A practical number of such inter-surface reflections will be determined by the size of the deflecting surfaces to be accommodated on the helmet and the power needed to drive them.

Accordingly, it is an object of the present invention to provide a novel helmet mountable stereoscopic, full-color video display using only a single lens.

This and other objects of the invention will become clear to those skilled in the art by reference to the detailed description, when considered in connection with the accompanying drawing.

BRIEF DESCRIPTION OF THE DRAWING

FIG. 2 is an overhead schematic diagram of the optical paths of importance in the present invention; and FIG. 3 is a schematic optical view illustrating the unfolding of the 1:1 telescope formed by the single lens and scanner mirrors of the presently preferred embodiment.

DETAILED DESCRIPTION OF A PRESENTLY PREFERRED EMBODIMENT

Figure 1:
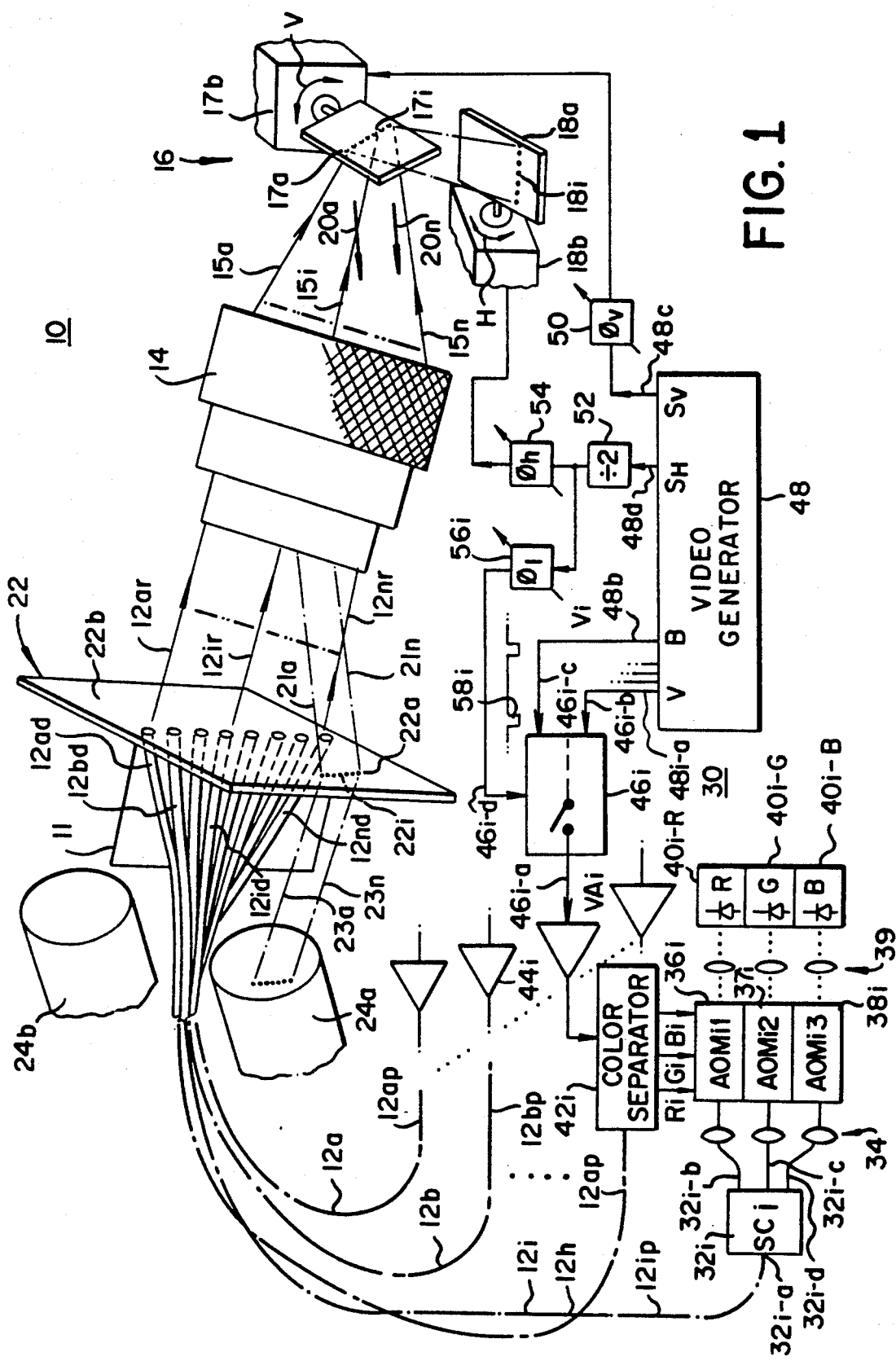
FIG. 1 is a perspective view of a helmet mountable display system in accordance with the present invention.

Referring to all of the Figures, a helmet mountable display system 10, in accordance with the present invention, comprises structural means 11 supporting a plurality N of optical fibers 12a-12n, each having a proximal end 12ap-12np and a distal end 12ad-12nd. The distal ends all are aligned to cause illumination exiting the fibers to provide rays 12ar-12nr traveling through a single lens means 14 and thence as rays 15a-15n through scanning means 16, before re-entering single lens means 14 for formation of an image 22i scanable across each of a pair of juxtaposed screens 22a/22b, for providing respective left and right images individually to the wearer's eyes through relay means 24a/24b.

Specifically, there is a plurality N (here, N=8) of optical fibers 12, denominated 12a, 12b, . . . , 12i, . . . , 12n, each having a distal end 12ad, 12bd, . . . , 12id, . . . , 12nd individually emitting a light beam 12ar, 12br, . . . , 12ir, . . . , 12nr; the beams pass through a first lens surface 14a, are refracted within lens 14 and exit through the second lens surface 14b as refracted rays 15a, . . . , 15i, . . . , 15n. Scanning means 16 includes a vertical scanning mirror means 17a upon which the line of light fiber end spots appear as a first scanned image 17i. The mirror means 17a is driven by a vertical galvanometer means 17b for movement in the directions of arrows V. Scanning means 16 also includes a horizontal scanning mirror means 18a driven by a horizontal galvanometer 19b; the line 19i of light spots are reflected from mirror 18a back to mirror 17a. Light rays 20a-20n, reflected from mirror means 17a/18a, enter the second surface 14b of the single lens means 14, re-traverse the single lens 14 and, after again undergoing refraction in lens 14, emerge from the first lens surface 14a. The resulting rays 21a-21n appear on either a left planar image area portion (e.g. a first screen means) 22a or a right planar image area portion (e.g. a second screen means) 22b of a rear projection screen means 22; the amount of movement, relative to a central position, of horizontal mirror means 18a horizontally determines on which of screen portions 22a or 22b the line 22i of light spots impinges at any particular time, while the amount of movement, relative to another central position, of vertical mirror means 17a vertically determines where the light spot line 22i will impinge on that screen portion. The lights of spot line 22i are projected, as rays 23a-23n, to the input 24a1 or 24b1 of an associated one of left or right relay means 24a/24b, for transmission to an associated output end 24a2/24b2 thereof and thence as rays 25i1/25i2. The relayed rays can be optically redirected, as by mirrors 26a/26b and the like, and/or focused, until final rays 27i1/27i2 are directed to the associated eye 28a/28b of the wearer 28 of the helmet 30 on which at least the majority of the optical elements are mounted (FIG. 2).

Fiber distal ends 12ad-12nd, lens means 14, vertical scanning means 17, horizontal scanning means 18 and screen means 22 thus form inputs to, elements of and a focal plane output of a folded 1:1 telescope (see FIG. 3 for a representation thereof, unfolded about a central line passing effectively through the horizontal mirror 18); the second reflection from the vertical mirror appears as if an imaginary mirror 17' were used, similar to the appearance of use of an imaginary lens 14', between horizontal mirror 18 and focal plane 22. All of means 11 through 22 may be securely mounted or fastened to a helmet (not shown-see U.S. Pat. No. 4,897,715 for details) and are appropriate oriented and aligned along optical paths as hereinabove described. The images 22i formed on screen means portions 22a/22b are relayed via optical relay means 24a/24b to the wearer in manner now well known to the art.

The terms "horizontal" and "vertical" are used in a conventional sense to refer to square or rectangular raster-scanned images wherein the raster is scanned in orthogonal directions. However, the present invention is not limited to only true horizontal and vertical scans but will operate with a scan having orthogonal scan directions in any spatial orientation. Similarly, the single lens means signifies the use of a single lens group, which may have only one element (as in FIG. 3) or mazy be a compound lens group with several elements (as shown by the plural lens elements 14-1 and 14-2 of FIG. 2); in either case, the first lens surface 14a receives light from the fibers 12 and the second lens surface 14b emits the refracted rays therefrom towards scanner means 16.

Fiber support means 11 is illustrated as receiving a plurality (n=8) of optical waveguides or fibers 12a-12n, respectively. The actual number of fibers is equal to the number of zones from which the ultimate image is formed. Support means 11 may be fixedly secured to screen 22 and/or to the helmet (to which the screen will be directly or indirectly secured). Ideally, it is desirable that both the center of the row of ends of fibers 12 and the center line between substantially equal image areas of screen portions 22a/22b lie along a central optical axis of lens 14. The lens will ideally be so placed from each end of fibers 12 as to collimate, converge and direct the emergent beams 12ar-12nr so that all converging ray paths will be intercepted by mirror 17a while still permitting a desired full image (from ends of fibers 12) to be formed on screen 22. Thus, light output from each distal end of fibers 12a-12n spreads out in a cone, which is then collimated by lens 14, subjected to scanning by vertical scanning means 17 and horizontal scanning means 18, and is re-imaged to the size of a pixel point on screen 22 by lens 14. From the size of screen 22, the size of the image of the ends of fibers 12a-12n necessary to permit the required number of pixels to be disposed in each of zones of each screen portion, and the overall optical gain provided by lens 14, the appropriate size of the end of fibers 12a-12n may be determined. The ends of the fibers 12a-12n are generally round; however, other shapes, such as square or hexagonal, may be used if desired. For the present description, eight fibers 12 will be used, it being understood that a greater or lesser number may be employed. Fiber distal ends 12ad-12nd are shown disposed in a substantially vertical row at the middle of screen 22. Alternatively, fiber ends 12ad-12nd may be disposed in a vertical row placed at the left or right side of the screen, or in a horizontal row at the top or bottom of screen 22, or even at some point on the screen; a modified arrangement of lens 14 and scanner means 16 may be required if some other fiber end row orientation is selected. In addition, light emission from the distal ends 12ad-12nd of the fibers is used to form a stereoscopic pair of full color images on screen 22, with one image appearing on portion 22a and the other on portion 22b. The pair of images are formed on screen 22 in response to respective color information, wherein the images on screen portions 22a and 22b are correlated to each other for ultimately supplying a respective image to each eye of an observer wearing the display helmet and thereby providing a stereoscopic view. It is noted that each screen portion 22a and 22b will be divided into a plurality N (here, eight) of contiguous bands, or zones, that are disposed in a vertical direction, with each zone being used for display of a corresponding portion of the image. There are a corresponding equal number (i.e., eight) of fibers 12a–12n for providing video information to respective zones. A detailed explanation for forming a raster scanned full-color image from the ends of fibers may be had by reference to the aforementioned U.S. Patent and Application.

Referring to FIG. 1, a schematic illustration and brief description of one possible set of optoelectronics means 30 for forming the light energy signals entering the fiber proximal ends and for synchronizing the scanner means, will be given, as there are several unique requirements in this system, due to the use of a single set 12 of fibers and a single lens 14. The actual image to be displayed on screen 22 is formed by modulated light emitted from the distal fiber ends 12ad–12nd. The modulated light for each channel fiber 12i, for the i-th channel, is provided to the proximal end 12ip of that fiber from the output 32ia of a channel coupling means 32; here, the coupling means is a 3-input, single-output star-type coupler SCi. The individual coupler inputs 32i-b, 32i-c and 32i-d each receive, via suitable optical means 34, the modulated monochrome light beam output from an associated output of one of first, second and third channel modulations means 36i, 37i, and 38i, each responsive to a different color light beam at a light input to that modulator, and to a video signal Ri, Gi or Bi provided to an associated modulation control input of that individual modulator. Advantageously, each of means 36-38 is an acousto-optic modulation device AOMi1-AOMi3 of type well known to the art. The individual red, blue or green monochrome light is supplied to input of the associated individual modulator via appropriate optical means 39 from an associated monochrome light source 40i-R, 40i-G or 40i-B. The channel Ri, Gi and Bi video signals are provided at the outputs of a channel color separator means 42i, driven by a channel video amplifier VAi means 44i, which receives a sync'd channel video signal from the output 46i-a of a channel video switch means, itself receiving channel color video information Vi at a first input 46i-b, blanking information B at another input 46i-c and phased-horizontal-sync information at an input 46i-d.

The channel video V signals are provided at an output 48i-a (one of N channel video outputs) and the common blanking signal is provided at another output 48b of a video generator means (which might be DAC means at the interface out of a Computer Image Generator and the like). Means 48 also outputs vertical $S_V$ and horizontal $S_H$ synchronization signals, at respective outputs 48c and 48d. The single vertical sync $S_V$ signal is phase adjusted in a vertical phase $\phi_v$ adjustment means 50, prior to synchronizing the vertical scanning means 17b. The single horizontal sync $S_H$ signal is first frequency reduced by a divide-by-2 means 52 (because the image line 22i must be scanned across the right screen portion 22b, in between successive scans of the left screen portion 22a, and vice versa, to interleave left and right images from a single source line operating with a single lens 14 and scanner 16) and is then phase adjusted in a horizontal phase $\phi_h$ adjustment means 54, prior to synchronizing the horizontal scanning means 18b. The divider 52 output can also be passed to the channel switching means 46, after passage through a separate channel phasing adjust means 56i, for use in establishing proper channel blanking pulse 58i timing.

There has been illustrated and described a self-contained, lightweight full color stereoscopic display system. While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A helmet mountable display (HMD) system for displaying a scanned stereoscopic image to a wearer of the helmet, comprising:

a plurality N of arrayed light source means each for supplying a respective modulated light beam;

a single lens means having a first surface receiving the arrayed plurality of light beams and a second surface from which a refracted beam is transmitted for each array light beam entering the first surface;

first and second screen means juxtaposed to one another;

first and second means for deflecting the refracted beams from the single lens means second surface to scan across the first and second screen means, to form at least portions of images thereon; and optical system means for individually energizing the arrayed light sources and for relaying the first and second screen means images to the viewing organs of the wearer.

2. The HMD system of claim 1, wherein the deflecting means causes the refracted beams to again pass through the single lens means prior to impinging upon the first and second screen means.

3. The HMD system of claim 2, wherein the deflecting means includes first and second reflective members respectively oscillatable about respective first and second axes to scan each of the plurality of sources, after refraction through the single lens means, across the first and second screen means.

4. The HMD system of claim 3, wherein the first and second members cooperate to scan the source beams in raster fashion.

5. The HMD system of claim 4, wherein the first and second screen means are scanned in an interleaved manner.

6. The HMD system of claim 1, wherein the array of light sources are located substantially between the first and second screen means.

7. The HMD system of claim 6, wherein the light sources are arrayed along a substantially vertical line.

8. The HMD system of claim 1, wherein the single lens means comprises a single convex lens.

9. The HMD system of claim 1, wherein each of the arrayed light sources is a distal end of an associated light-carrying optic fiber, each having a proximal end receiving a video-modulated optical signal of at least varying amplitude.

10. The HMD system of claim 9, wherein the proximal end of each fiber receives an individually modulated channel light signal.

11. The HMD system of claim 10, wherein each i-th channel, where $1 \leq i \leq n$, includes: means for forming a plurality of different monochromatic light signals; and means for combining the plurality of different monochromatic light signals for that channel to form a full-color signal for introduction into the channel fiber proximal end.

12. The HMD system of claim 11, wherein the combining means is a star coupler, receiving first, second and third individually-modulated light beams for providing a single combined output beam.

13. The HMD system of claim 11, wherein each of the different monochromatic light beams are provided by: a light source of an associated monochrome color; and means for individually varying the amplitude of the light entering the combining means from each different source.

14. The HMD system of claim 13, further comprising means for providing a modulating video signal to each individual-varying means and for simultaneously providing synchronizing signals to the deflecting means to cause proper scanning of the arrayed source beams across the first and second screen means.

15. The HMD system of claim 14, wherein the synchronizing signal providing means includes means for adjusting the phase of the signal synchronizing at least one of the first and second deflecting means.

16. The HMD system of claim 15, wherein said adjusting means is provided for each of the first and second deflecting means.

17. The HMD system of claim 14, wherein the synchronizing signal to one of said first and second deflection means is reduced in frequency by a factor of two, to cause the two screen means to be scanned in interleaved fashion.

18. The HMD system of claim 9, further comprising means for providing an individually video-modulated light signal to each individual one of the fibers and for simultaneously providing synchronizing signals to the deflecting means to cause proper scanning of the arrayed source beams across the screen means.

19. The HMD system of claim 18, wherein the synchronizing signal providing means includes means for adjusting the phase of the signal synchronizing at least one of the first and second deflecting means.

20. The HMD system of claim 18, wherein the synchronizing signal to one of said first and second deflection means is reduced in frequency by a factor of two, to cause the two screen means to be scanned in interleaved fashion.

* * * * *